No. 771,362. PATENTED OCT. 4, 1904.
J. A. ELLSWORTH.
DIP NET.
APPLICATION FILED MAR. 23, 1904.
NO MODEL.
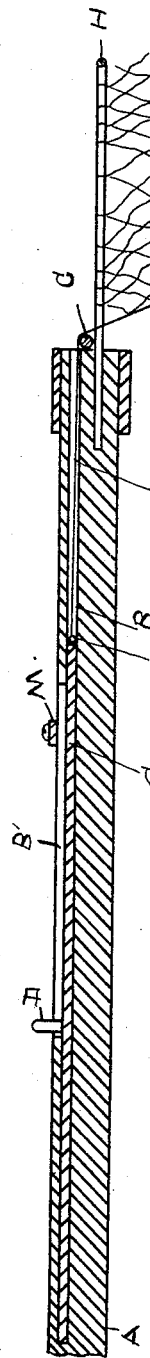
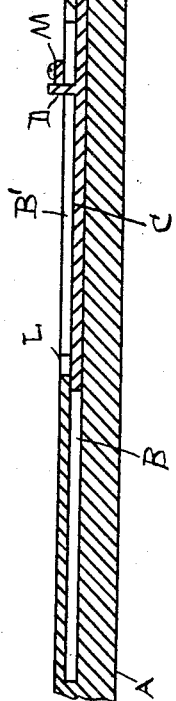
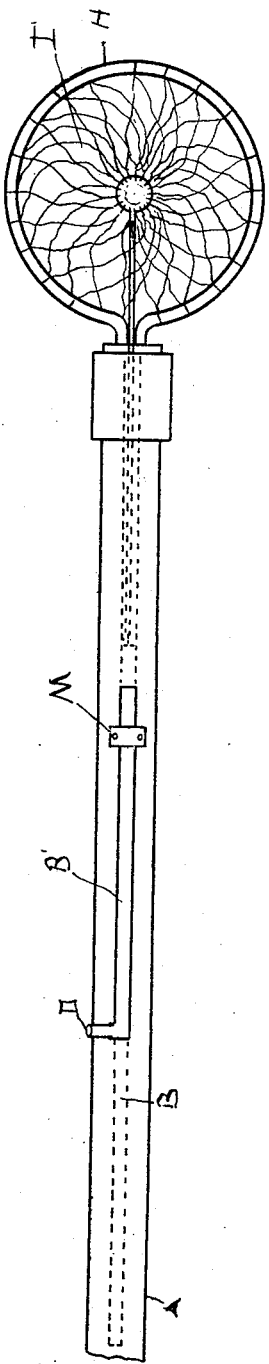
Witnesses:
Lucy Verrill
Marion Richards.
Inventor:
James A. Ellsworth
by
Clifford Verrill Clifford
attorneys No. 771,362.

Patented October 4, 1904.

UNITED STATES PATENT OFFICE.

JAMES A. ELLSWORTH, OF PORTLAND, MAINE.

DIP-NET.

SPECIFICATION forming part of Letters Patent No. 771,362, dated October 4, 1904.

Application filed March 23, 1904. Serial No. 199,554. (No model.)

*To all whom it may concern:*

Be it known that I, JAMES A. ELLSWORTH, a citizen of the United States, residing at Portland, in the county of Cumberland and State of Maine, have invented new and useful Improvements in Dip-Nets, of which the following is a specification.

This invention relates to improvements in dip-nets, and especially to that kind of dip-nets which are used for removing fish from seines or pounds. It is so constructed that it may be emptied without being inverted.

In the drawings herewith accompanying and forming a part of this application, Figure 1 is a sectional view of my improved net, the net portion itself being pursed. Fig. 2 is a sectional view showing the net open, and Fig. 3 is a top plan view.

Same letters of reference refer to like parts.

In said drawings, A represents a handle made in the usual form of any suitable material. Running through said handle is a channel B, open at the top for a portion of the distance, as seen at B', which channel may extend the full length of the handle or not, as deemed necessary. Adapted to move in said handle is a rod C, having an angular extension D thereon. In one end of said rod is a ring E. Attached to said ring is a purse-line F. The purse-line may be constructed of rope, twine, wire, or any other suitable material and may be double or single, as required. Where said purse-line enters the channel is placed a roller G to prevent any undue friction by the line and also to prevent it from wearing off as it runs out over the end of the channel. Attached to one end of the handle in any suitable manner is the usual bail H, carrying thereon a net I. The lower end of the net is provided with a series of rings J or other equivalent device, through which runs the purse-line, said purse-line being attached firmly to one of the rings, so that when a drawing force is exerted on said line the rings may be brought together and the bottom of the net closed sufficiently to prevent the escape of any of the fish therefrom. The opening B' at the top of the channel B is provided to allow the angular extension of the sliding rod to extend therethrough. The channel B is also provided with an angular offset L, which is so placed in relation to the angular extension in the rod that when the rod is brought back as far as possible the extension D thereon fits into said offset and holds the rod from running outwardly. In order to prevent the ring-bearing end of the rod from going too far out of the channel and at the same time to enable a purse-line to be properly attached to the sliding rod, I provide a clasp M, attached to the top of the channel in any suitable manner and at such position that when the net is in use the rod will be prevented from sliding all the way out through the channel; but when it is desired to attach a new purse-line to said rod the clasp may be removed, the rod pushed outwardly and a new line inserted, and the rod then brought back to place.

I do not wish to be limited to the exact form of rod or means for drawing in the purse-line, because other means, such as a simple line running along the handle, may be employed without departing from the spirit of my invention.

The operation of my device is as follows: Before the net is used the sliding rod is drawn backward toward the end of the handle opposite to that on which the net is placed until the extension D is opposite the offset L. The rod is then revolved on itself until the extension fits into the offset. This tightens the purse-line, draws the rings together, and closes the bottom of the net and keeps it closed. The net is then filled with the fish and brought to the place of discharge. Instead of being compelled, as has been the custom in the past on fishing vessels and at the pound, of tipping the net over the projection on the sliding rod is released from the offset in the channel, the rod slides outwardly, the bottom of the net is opened, and the fish or other contents in said net are discharged very easily.

On fishing vessels and especially those vessels engaged in the mackerel or pogie industry, dip-nets of large size are required to remove the fish from the seines and place them on the deck or in barrels for keeping. These nets have always been of large size and rather difficult to manage, the nets being capable of carrying from two or three to eight barrels of fish at one time. The old method of emptying the net consisted in swinging the net onto the deck of the vessel and two or three men taking hold of the bail, inverting the net, discharging in only this way the contents. With this improved device after the fish have been collected in the dip-net the net can be swung to any suitable discharge-place on the vessel, such as over a barrel or over the hold, the catch can be released, and the fish can be dumped very easily and quickly. In using the old-style nets the process of emptying them has been very laborious and has necessitated the employment of a number of men, and from the fact that the fish cannot be easily and readily placed in any desired part of the boat many fish are spoiled by being stepped upon and crushed by the men while handling the net. This is altogether obviated by using my improved device, and also the services of two men to each net is dispensed with.

The advantages of my improved device are that it is simple of construction, inexpensive, and exceedingly easy to handle and effective in discharging its contents.

Having thus described my invention and its use, I claim—

1. In a dip-net, a handle, a bail at one end, a net on said bail and means for opening and closing the bottom of said net.

2. In a dip-net, a handle, a bail at one end of said handle, a net on said bail and means on said handle for opening and closing the bottom of said net.

3. In a dip-net, a handle, a bail thereon, a net on said bail, purse-lines attached to the bottom of said net and means on the handle for actuating said purse-lines so that the bottom of said net may be opened or closed.

4. In a dip-net, in combination, a handle, a channel running therethrough, a sliding rod capable of longitudinal movement in said channel, a purse-line attached to said sliding rod, a net on said handle, said purse-line being adapted to open and close the bottom of said net.

5. In a dip-net, a suitable handle having a channel therein, a rod capable of longitudinal movement in said channel, means for holding said rod in position in said channel, means for preventing said rod from moving out of said channel, a net on said handle, a line running from said rod to the bottom of said net, whereby the bottom of said net can be opened or closed by the backward or forward movement of said rod.

In testimony whereof I have hereto affixed my name, in presence of two subscribing witnesses, this 19th day of March, 1904.

JAMES A. ELLSWORTH.

In presence of—
NATHAN CLIFFORD,
MARION RICHARDS.